Nov. 1, 1927.

H. W. ALDEN 1,647,119

BRAKE FOR AUTOMOBILES

Filed Jan. 2, 1925

INVENTOR:
Herbert W. Alden,
by Cameron & Cameron
HIS ATTORNEYS.

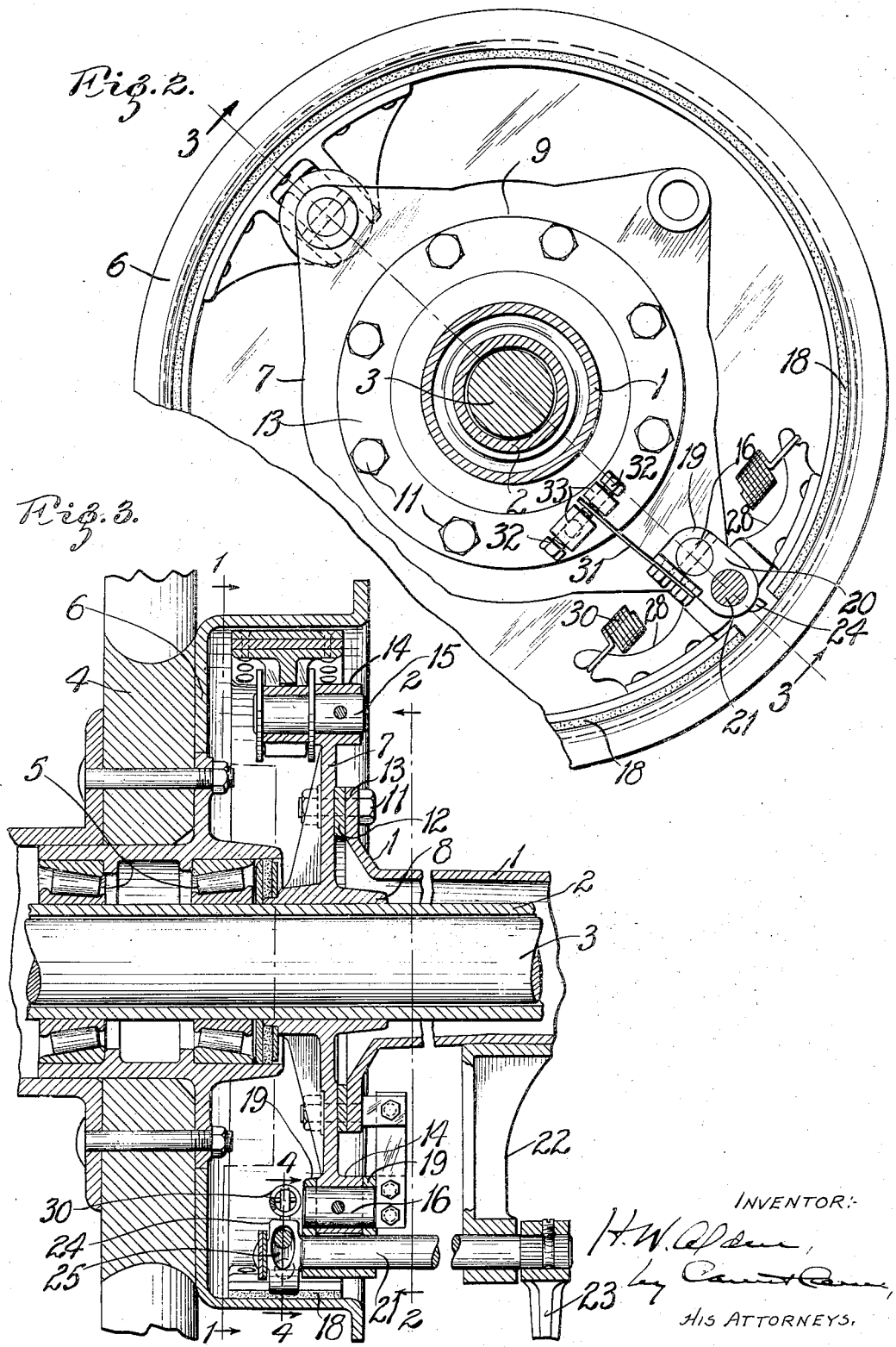

Patented Nov. 1, 1927.

1,647,119

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

BRAKE FOR AUTOMOBILES.

Application filed January 2, 1925. Serial No. 115.

My invention relates to brakes for automobiles and has for its principal object to provide for the equalization of the pressures of the actuating cam against the ends of the brake band or the brake shoes. It consists principally in mounting the actuating cam on a floating support whose position is determined by the reaction pressures of the ends of the brake band or brake shoes. It also consists in the combinations and arrangements of parts hereinafter described and claimed.

In the accompanying drawing, which forms part of this specification and wherein like symbols refer to like parts wherever they occur, Fig. 1 is a vertical sectional view of my brake on the line 1—1 of Fig. 3, looking toward the right and showing parts of the axle construction;

Fig. 2 is an elevation of the brake and a vertical section of the axle along the line 2—2 of Fig. 3 looking to the left;

Fig. 3 is a vertical longitudinal section of the brake, road wheel and axle on the line 3—3 of Fig. 2.

Figure 1:
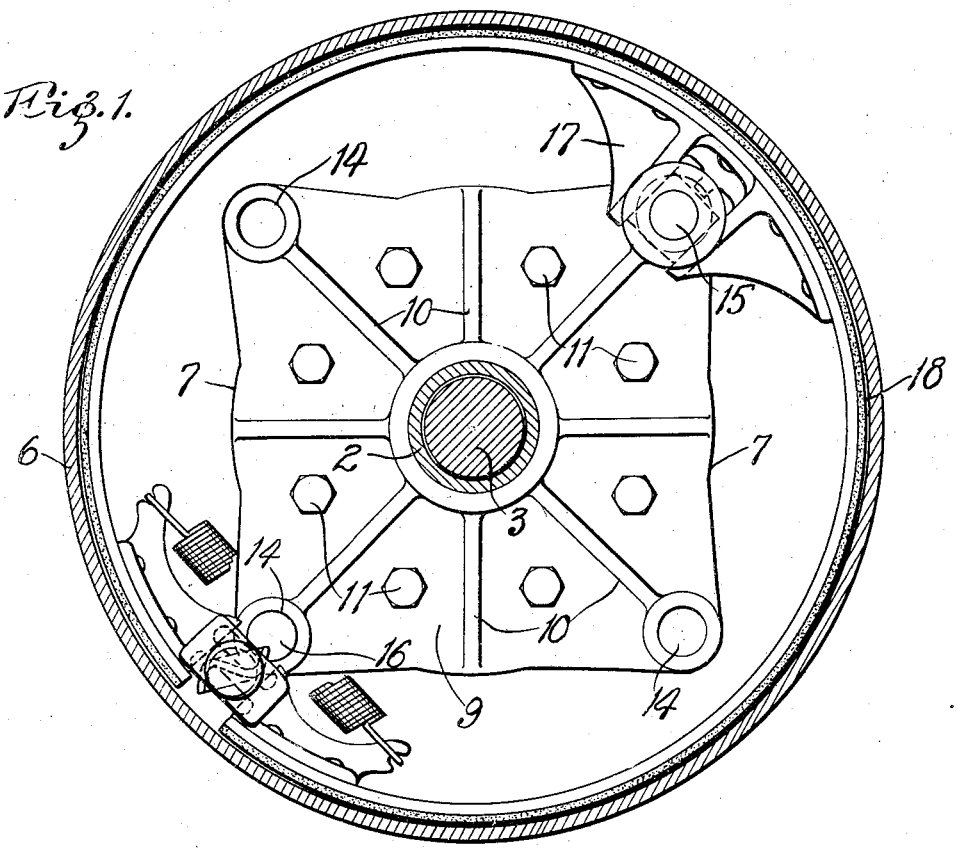
Figure 4:
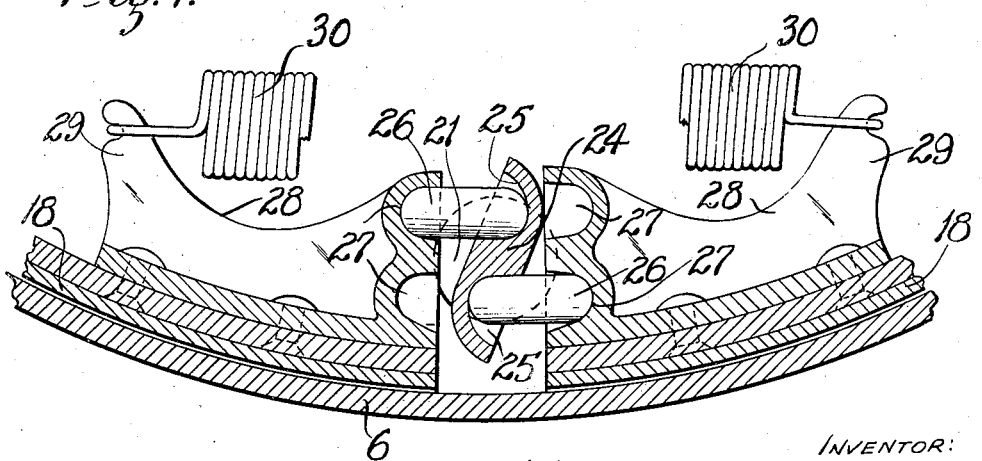
Fig. 4 is an enlarged detail sectional view of the operating cam on the line 4—4 of Fig. 3.

The accompanying drawing illustrates my brake mounted on the driving axle of an automobile. The axle illustrated comprises a hollow housing 1, a hollow liner 2 inside of said housing, and a driving shaft 3 inside of said liner. The road wheel 4 is of common type and mounted in any suitable way upon the axle. The drawing illustrates the road wheel mounted on the liner, with roller bearings 5 of the tapered roller type interposed between them. A brake drum 6 is mounted on the wheel in any suitable manner.

The brake spider or support 7 comprises a centrally bored hub 8 that fits over the liner 2 and a radially extending disk portion 9 provided with radial strengthening ribs 10 integral therewith. This disk portion 9 is secured by bolts or rivets 11 that pass through said disk and through an annular reinforcing member 12 and an annular flange formed on the end of the axle housings 1, as indicated at 13. The outer portion of the disk 9 is provided with diametrically opposite bosses 14 that are bored parallel with the axis of the spider so as to adapt them to receive pintles or pivot studs 15 and 16 which are fixed therein. The upper pintle 15 projects from its spider toward the road wheel and the projecting portion serves as a guide for a bifurcated casting 17, which straddles said pintle and has the middle portion of the brake band 18 riveted or otherwise secured to it. By this arrangement, the brake band is enabled to have a radial movement with relation to the brake drum.

The pintle 16 diagonally opposite said first mentioned pintle 15 projects at each end beyond the brake spider and, fitted over the projecting ends thereof, so as to oscillate thereon, are the bored ends 19 of a yoke-shaped block 20, whose body portion is bored parallel with the axis of the spider. Rotatably mounted in the bore of said swinging or oscillating block 20 is a shaft 21 whose inner end is mounted in a bracket 22 supported by the housing 1 and is provided with a lever 23 provided with suitable connecting devices adapted for convenient manipulation by the driver of the automobile. At the outer end of this shaft (by which is meant the end located between the brake spider and the road wheel) is a cam or rock arm 24. This cam comprises an arm that projects radially in opposite directions from the axis of the shaft and has a concave recess 25 in each side face thereof, said recesses being on opposite sides of the axis. In each recess is located one convex end of a spreader link 26 whose other end also is convex and is mounted in a concave recess 27 formed therefor in the end of a casting or fitting 28 that is riveted or otherwise secured to an end of the brake band or brake shoe 18. Each of these end fittings 28 is provided with an inwardly projecting hook-shaped portion 29 adapted to receive the end of a coil tension spring 30, whose function is to keep the brake band normally contracted clear of the brake drum.

As above stated, the swinging block 20 in which the cam actuating shaft 21 is mounted, is pivotally supported on the ends of the pintle 16 fixed in the brake spider 7. The mounting of the shaft 21 gives it sufficient play to accommodate this swinging movement. The purpose of enabling this shaft supporting block to swing is to enable the actuating cam 24 to adapt itself automatically to the reaction pressures on the ends of the brake band. The inner fork 19 of the swinging block has a flat spring 31 fastened thereto and extending inwardly toward the axis of the axle. The inner end of this spring is located between two adjusting screws 32 that work in threaded lugs 33 provided therefor on the brake spider 7. In practice, the brake band is expanded to its set position; and while in this set position, the adjusting screws 32 are set against the inner end of the spring 31, whereby, when the cam 24 is released and the brake band contracted clear of the drum, the cam will remain in proper operative and adjusted position relative to the ends of the brake band. In case the reaction pressure of one end of the brake band tends to exceed the reaction pressure of the other end, the swinging block shifts the position of the cam and tends to equalize the pressures, this swinging action being made possible by the resiliency of the spring. In this way, both ends of the brake band are fully utilized for frictional engagement with the drum.

Obviously, the device hereinbefore described admits of considerable variation without departing from my invention, which is characterized mainly by the ability of the actuating cam to float and thereby automatically adjust itself to the reaction pressures of the ends of the brake band, or brake shoe, brake bands and brake shoes being considered full equivalents in this connection.

What I claim is:

1. In a vehicle comprising an axle member and a wheel mounted on said axle member, a brake comprising a drum on said wheel, a spider on said axle member, a friction member anchored on said spider, a cam located between and operatively connected to the ends of said friction member, a shaft for actuating said cam, a support for said shaft pivotally mounted on said spider to swing towards or from said ends respectively to equalize the pressures of the cam thereon, and means for adjusting the position of said cam between said ends, said means comprising an arm extending transversely from said shaft support and adjusting members for positioning said arm and thereby swinging said shaft support to desired position relative to said ends.

2. In a vehicle comprising an axle member and a wheel mounted on said axle member, a brake comprising a drum on said wheel, a spider on said axle member, a brake band anchored on said spider, a cam located between and operatively connected to the ends of said band, a shaft for actuating said cam, a support for said shaft pivotally mounted on said spider to swing towards or from the ends of said brake band respectively to equalize the pressures of the cam thereon, and means for normally holding said shaft support in predetermined position and restoring it to said position when displaced therefrom, said means being yieldable to permit said shaft support to swing to equalize the pressures of the cam against the respective ends of said brake band.

3. In a vehicle comprising an axle member and a wheel mounted on said axle member, a brake comprising a drum on said wheel, a spider on said axle member, a friction member anchored on said spider, a cam located between and operatively connected to the ends of said member, a shaft for actuating said cam, a support for said shaft pivotally mounted on said spider to swing towards or from said ends respectively to equalize the pressures of the cam thereon, and means for adjusting the position of said cam between said ends, said means comprising adjusting members movable towards and away from each other and a resilient arm extending transversely from said shaft support and between said adjusting members whereby said shaft support is yieldably adjusted in desired position.

4. In a vehicle comprising an axle member and a wheel mounted on said axle member, a brake comprising a drum on said wheel, a spider on said axle member having a pivot stud thereon, a brake band anchored on said pivot stud, a cam located between and operatively connected to the ends of said band, a shaft for actuating said cam, a pintle on said spider, a support for said shaft pivotally mounted on said pintle to swing towards or from the ends of said brake band respectively to equalize the pressures of the cam thereon, and means for adjusting the position of said cam between said ends and normally holding it against swinging movement, said means comprising opposed adjusting members and a resilient arm extending from said shaft support and between said adjusting members.

5. In a vehicle comprising an axle member and a wheel mounted on said axle member, a brake comprising a drum on said wheel, a spider on said axle member, a brake band anchored on said spider, a cam located between and operatively connected to the ends of said band, a shaft for actuating said cam, a support for said shaft pivotally mounted on said spider to swing towards or from the ends of said brake band respectively to equalize the pressures of the cam thereon, and adjustable means for normally holding said shaft support in predetermined position and restoring it to said position when displaced therefrom, said means being yieldable to permit said shaft support to swing to equalize the pressures of the cam against the respective ends of said brake band.

Signed at Detroit, Michigan, this 4th day of December, 1924.

HERBERT W. ALDEN.